US008496238B1

(12) United States Patent
Orgeron

(10) Patent No.: US 8,496,238 B1
(45) Date of Patent: Jul. 30, 2013

(54) TUBULAR GRIPPING APPARATUS WITH LOCKING MECHANISM

(75) Inventor: Keith J. Orgeron, Houston, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 918 days.

(21) Appl. No.: 12/371,590

(22) Filed: Feb. 14, 2009

Related U.S. Application Data

(63) Continuation-in-part of application No. 12/359,926, filed on Jan. 26, 2009.

(51) Int. Cl.

| | |
|---|---|
| ***B25B 5/16*** | (2006.01) |
| ***B25B 1/14*** | (2006.01) |
| ***B25B 1/06*** | (2006.01) |
| ***B25B 1/20*** | (2006.01) |
| ***B25B 27/14*** | (2006.01) |
| ***B25B 27/00*** | (2006.01) |
| ***B25B 13/50*** | (2006.01) |
| ***B25B 17/00*** | (2006.01) |
| ***B23Q 3/08*** | (2006.01) |
| ***B23P 19/04*** | (2006.01) |

(52) U.S. Cl.
USPC ............... 269/270; 269/32; 269/228; 269/24; 269/43; 269/45; 269/218; 29/252; 29/261; 29/278; 29/218; 29/270; 29/244; 29/271; 81/57.33; 81/57.16; 81/57.19

(58) Field of Classification Search
USPC ............ 269/32, 228, 24, 43, 45, 218; 29/252, 29/261, 278, 218, 270, 244, 271; 81/57.33, 81/57.16, 57.19
See application file for complete search history.

(56) References Cited

U.S. PATENT DOCUMENTS

| | | | |
|---|---|---|---|
| 1,396,317 | A | 11/1921 | Boyter |
| 1,417,490 | A | 5/1922 | Brandon |

(Continued)

FOREIGN PATENT DOCUMENTS

| | | | |
|---|---|---|---|
| JP | 2001-287127 | A | 10/2001 |
| WO | 93/15303 | A1 | 8/1993 |
| WO | 2010/085803 | A2 | 7/2010 |

OTHER PUBLICATIONS

U.S. Appl. No. 12/111,907, filed Apr. 29, 2008; titled "Pipe Gripping Apparatus".

(Continued)

*Primary Examiner* — Monica Carter
*Assistant Examiner* — Nirvana Deonauth
(74) *Attorney, Agent, or Firm* — John G. Fischer, Esq.; Paul D. Lein, Esq.; Scheef & Stone, L.L.P.

(57) ABSTRACT

A tubular gripping apparatus has a jaw assembly that has a tubular-contacting surface at an end thereof, a drive yoke that has a tubular-contacting surface at an end thereof, an actuator connected to the drive yoke, and a locking mechanism interconnected to the drive yoke. The drive yoke is connected to the jaw assembly. The actuator moves the jaw assembly and the drive yoke such that the tubular-contacting surfaces thereof move radially inwardly for a substantially identical distance. The locking mechanism directs a load away from the actuator while the jaw assembly and the drive yoke grip the tubular. The locking mechanism has a cylinder yoke positioned around the piston-and-cylinder assembly, and a wedge assembly positioned adjacent the bearing bar and the cylinder yoke. The wedge assembly is suitable for contacting the cylinder yoke so as to prevent a movement of the cylinder yoke.

19 Claims, 8 Drawing Sheets

U.S. PATENT DOCUMENTS

| | | | | |
|---|---|---|---|---|
| 1,972,635 | A | 9/1934 | Whinnen | |
| 1,981,304 | A | 11/1934 | Brandt | |
| 2,124,154 | A | 7/1937 | Sovincz | |
| 2,147,002 | A | 2/1939 | Volpin | |
| 2,509,853 | A | 5/1950 | Wilson | |
| 2,535,054 | A | 12/1950 | Ernst, et al. | |
| 2,814,396 | A | 11/1957 | Neal, Sr. | |
| 3,016,992 | A | 1/1962 | Wilson | |
| 3,059,905 | A | 10/1962 | Tompkins | |
| 3,177,944 | A | 4/1965 | Knights | |
| 3,194,313 | A | 7/1965 | Fanshawe | |
| 3,280,920 | A | 10/1966 | Scott | |
| 3,290,006 | A | 12/1966 | Dubberke | |
| 3,331,585 | A | 7/1967 | Dubberke | |
| 3,365,762 | A | 1/1968 | Spiri | |
| 3,432,159 | A | 3/1969 | Rakatansky | |
| 3,561,811 | A | 2/1971 | Turner, Jr. | |
| 3,675,303 | A | 7/1972 | McKinnon | |
| 3,702,640 | A | 11/1972 | Cintrack et al. | |
| 3,806,021 | A | 4/1974 | Moroz et al. | |
| 3,848,850 | A | 11/1974 | Bemis | |
| 3,883,009 | A | 5/1975 | Swoboda et al. | |
| 3,986,619 | A | 10/1976 | Woolslayer et al. | |
| 4,030,698 | A | 6/1977 | Hansen | |
| 4,221,269 | A | 9/1980 | Hudson | |
| 4,269,554 | A | 5/1981 | Jackson | |
| 4,276,918 | A | 7/1981 | Sigouin | |
| 4,290,495 | A | 9/1981 | Elliston | |
| 4,303,270 | A | 12/1981 | Adair | |
| 4,403,666 | A | 9/1983 | Willis | |
| 4,403,897 | A | 9/1983 | Willis | |
| 4,440,536 | A | 4/1984 | Scaggs | |
| 4,547,110 | A | 10/1985 | Davidson et al. | |
| 4,595,066 | A | 6/1986 | Nelmark et al. | |
| 4,650,237 | A | 3/1987 | Lessway | |
| 4,765,225 | A | 8/1988 | Birchard | |
| 4,834,604 | A | 5/1989 | Brittain et al. | |
| 4,869,137 | A | 9/1989 | Slator | |
| 5,150,642 | A | 9/1992 | Moody et al. | |
| 5,458,454 | A | 10/1995 | Sorokan | |
| 5,595,248 | A | 1/1997 | Denny | |
| 5,609,226 | A | 3/1997 | Penisson | |
| 5,649,745 | A | 7/1997 | Anderson | |
| 5,660,087 | A | 8/1997 | Rae | |
| 5,702,139 | A * | 12/1997 | Buck | 294/198 |
| 5,848,647 | A | 12/1998 | Webre et al. | |
| 5,931,238 | A | 8/1999 | Gilmore et al. | |
| 5,992,801 | A | 11/1999 | Torres | |
| 5,993,140 | A | 11/1999 | Crippa | |
| 6,047,771 | A | 4/2000 | Roynestad | |
| 6,220,807 | B1 | 4/2001 | Sorokan | |
| 6,227,587 | B1 | 5/2001 | Terral | |
| 6,237,445 | B1 * | 5/2001 | Wesch, Jr. | 81/57.18 |
| 6,253,845 | B1 | 7/2001 | Belik | |
| 6,263,763 | B1 | 7/2001 | Feigel, Jr. et al. | |
| 6,279,662 | B1 | 8/2001 | Sonnier | |
| 6,311,788 | B1 | 11/2001 | Weixler | |
| 6,471,439 | B2 | 10/2002 | Allamon et al. | |
| 6,543,551 | B1 | 4/2003 | Sparks et al. | |
| 6,543,555 | B2 | 4/2003 | Casagrande | |
| 6,550,128 | B1 | 4/2003 | Lorenz | |
| 6,557,641 | B2 | 5/2003 | Sipos et al. | |
| 6,581,698 | B1 | 6/2003 | Dirks | |
| 6,745,646 | B1 | 6/2004 | Pietras et al. | |
| 6,748,823 | B2 | 6/2004 | Pietras | |
| 6,763,898 | B1 | 7/2004 | Roodenburg et al. | |
| 6,814,149 | B2 | 11/2004 | Liess et al. | |
| 6,845,814 | B2 | 1/2005 | Mason et al. | |
| 7,017,450 | B2 | 3/2006 | Bangert | |
| 7,028,585 | B2 | 4/2006 | Pietras et al. | |
| 7,036,202 | B2 | 5/2006 | Lorenz | |
| 7,055,594 | B1 | 6/2006 | Springett et al. | |
| 7,090,035 | B2 | 8/2006 | Lesko | |
| 7,090,254 | B1 | 8/2006 | Pietras et al. | |
| 7,117,938 | B2 | 10/2006 | Hamilton et al. | |
| 7,121,166 | B2 | 10/2006 | Drzewiecki | |
| 7,249,639 | B2 | 7/2007 | Belik | |
| 7,296,623 | B2 | 11/2007 | Koithan et al. | |
| 7,398,833 | B2 | 7/2008 | Ramey et al. | |
| 7,438,127 | B2 | 10/2008 | Lesko | |
| 7,503,394 | B2 | 3/2009 | Bouligny | |
| 7,946,795 | B2 | 5/2011 | Orgeron | |
| 8,011,426 | B1 | 9/2011 | Orgeron | |
| 8,235,104 | B1 | 8/2012 | Sigmar et al. | |
| 2002/0079105 | A1 | 6/2002 | Bergeron | |
| 2003/0221871 | A1 | 12/2003 | Hamilton et al. | |
| 2005/0269133 | A1 | 12/2005 | Little | |
| 2006/0027793 | A1 | 2/2006 | Kysely | |
| 2006/0278400 | A1 | 12/2006 | Bouligny | |
| 2008/0078965 | A1 | 4/2008 | Lane et al. | |
| 2008/0174131 | A1 | 7/2008 | Bouligny et al. | |
| 2008/0202812 | A1 | 8/2008 | Childers et al. | |
| 2008/0253866 | A1 | 10/2008 | Lops et al. | |
| 2010/0187740 | A1 | 7/2010 | Orgeron | |
| 2011/0200412 | A1 | 8/2011 | Orgeron | |

OTHER PUBLICATIONS

U.S. Appl. No. 12/371,591, filed Feb. 14, 2009; titled "Method of Gripping a Tubular With a Tubular Gripping Mechanism".

Chronis, Nicholas P.; Mechanisms & Mechanical Devices Sourcebook, 1991, Ch. 10, pp. 399-414, ISBN 0-07-010918-4, McGraw-Hill, Inc.

* cited by examiner

TUBULAR GRIPPING APPARATUS WITH LOCKING MECHANISM

CROSS-REFERENCE TO RELATED APPLICATIONS

The present application is a continuation-in-part of U.S. application Ser. No. 12/359,926, filed on 26 Jan. 2009, entitled "Pipe Gripping Apparatus," presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a tubular gripping apparatus. More particularly, the present invention relates to a tubular gripping apparatus that can be used to grip different diameters of tubular. More particularly, the present invention relates to the diversion of a load associated with gripping a tubular. Additionally, the present invention relates to a tubular gripping apparatus whereby the tubular is properly centered regardless of the diameter of the tubular.

2. Description of Related Art Including Information Disclosed Under 37 CFR 1.97 and 37 CFR 1.98.

The term "tubular" as used herein includes all forms of drill tubulars, drill collars, pipe, casing, liners, bottom hole assemblies (BHA), and other types of tubulars known in the art. In well drilling and well completion operations, it is necessary to lift and properly align lengths of downhole tubulars. For example, in oil or water well drilling, multiple lengths of drill pipe must often be raised from a horizontal position at or near ground level to a vertical position aligned with the centerline of the well. Such lifting and aligning operations require clamps for securely holding the pipe in place as it is lifted. When a pivotally mounted pipe boom is used, this boom must support large loads in several different orientations.

Compounding this problem is the fact that each joint of a length of a down-hole tubular must be closely aligned with a string of such tubulars after it has been lifted to the vertical position, such as when a drill pipe or casing is made up. A clamp, or gripper, for this purpose should preferably provide a necessary alignment for down-hole tubulars having various diameters, without any adjustment. Proper alignment has been a problem with many such clamps, or grippers, of the prior art, especially those employing pivoted clamping jaws. When pivoted clamping jaws are used, there is a tendency for the center of the down-hole tubular to vary as a function of the diameter of the tubular being clamped.

U.S. patent application Ser. Nos. 11/923,451, filed on Oct. 24, 2007 and 12/013,979, filed on Jan. 14, 2008 by the present inventor, describe pipe handling apparatuses whereby pipe is moved from a horizontal position to a vertical position with a single degree of freedom. In particular, these devices include grippers that grasp the pipe when it is in a horizontal position, move the pipe through the interior of a frame through the use of a particular pipe handling structure, and then position the pipe directly over the well center. Through the use of this device, pipe is accurately moved without the need for adjustment actuators or other mechanisms in order to provide the proper end location for the pipe. Unfortunately, with this device, the grippers associated with the device must be changed, as necessary, so as to accommodate the particular diameter of the pipe being used. The formation of such separate grippers is somewhat difficult because the grippers must be able to properly center the pipe. As such, a need has developed to provide a pipe gripper assembly whereby various diameters of pipe can be accommodated with a single gripper assembly and whereby the pipes that are accommodated by this gripper assembly are properly centered therein.

In many circumstances, the pipe can have very rigid side walls. In other circumstances, such as installation of a casing, the side walls of the tubular are relatively thin and flexible. As such, there is a need to develop a pipe gripper assembly whereby the various thicknesses of side walls can be accommodated by the tubular gripping apparatus. It is important that the tubular gripping apparatus not bend, deform, puncture or otherwise dent thin-walled tubulars.

In the past, various patents have issued relating to a tubular gripping apparatus. U.S. Pat. No. 3,280,920 issued on Oct. 25, 1966 to P. Scott, teaches a portable apparatus for drilling downhole wells. This apparatus has a mast having an open side and a means for supporting a string of drill pipes rotated within the mast. A means for raising and lowering a string of drill pipes in a rectilinear direction parallel to the longitudinal centerline of the mast is provided. This apparatus includes a hydraulic cylinder connected through a suitable arrangement of lines and sheaves so as to apply positive force upon the power swivel so as to move the swivel upwardly or downwardly in the mast as desired. This swivel is mounted on a wheeled carriage which runs on suitable tracks carried by the mast. An elongate frame is pivotably attached to the lower end of the mast for swinging movement to an open side of the mast between a substantially horizontal position and an upright position. Releasable clamps are adapted to grip a section of drill pipe mounted on the frame for a limited longitudinal reciprocating motion thereon.

U.S. Pat. No. 3,365,762, issued on Jan. 30, 1968 to W. H. Spiri, shows a well pipe gripping structure having a slip body having a pipe gripping insert which is slidably movable horizontally into an arcuate guideway in the slip body. The slip body is retained within the guideway by upper and lower lips on the body. The lips have asymmetric retaining surfaces. The inserts are provided with teeth which advance vertically as the teeth advance circularly. The teeth of one insert are positioned out of alignment with the teeth of the other insert to increase the resistance to rotation of the pipe within the slip structure.

U.S. Pat. No. 3,561,811, issued on Feb. 9, 1971 to J. W. Turner, Jr., teaches a well drilling rig having a pipe racker apparatus in which a number of racker arms are controllable from a remote location to engage drill pipe tool joints and drill collars. One of the arms has a head for supporting the weight of lengths of pipe or drill collars being added to or removed from the drill string.

U.S. Pat. No. 3,702,640, issued on Nov. 14, 1972 to Cintract et al., shows a tipping girder with a transfer of tubular elements. This tipping girder has a plurality of adjustable guide nippers movably positioned on the girder for movement transverse to the longitudinal axis thereof. There are adjustable locking nippers movably mounted on the girder for movement parallel to and transverse to the longitudinal axis thereof. The locking nippers are constructed to automatically engage and lock a rod on the girder when it is moved away from the horizontal position.

U.S. Pat. No. 3,806,021, issued on Apr. 23, 1974 to Moroz et al., shows a pipe centering apparatus. This apparatus has a carriage with a column mounted thereon to support a pipe end jointing mechanism. The carriage has a receptacle together with the column. The column pivotally supports a cantilever member of which the free extremity pivotably supports the pipe end jointing mechanism including coaxially arranged grippers adapted to retain the ends of the pipe.

U.S. Pat. No. 4,303,270, issued on Dec. 1, 1981 to H. L. Adair, shows a self-centering clamp for down-hole tubulars. This clamp includes first and second opposed clamping members guided along a clamping axis by first and second guide channels defined by a frame. Each clamping member defines a hydraulic cylinder in which is disposed a piston which is rigidly mounted to the frame. A rack is coupled to move with each of the clamping members. These racks are interconnected via a pinion gear which meshes with both racks so that the two clamping members move in a counter-directional manner and remain equidistant from a central point on the clamping axis.

U.S. Pat. No. 4,403,897, issued on Sep. 13, 1983 to Willis, provides a self-centering clamp for drilling tubulars. This self-centering clamp includes first and second transverse guide rods. Two opposed clamping jaws are guided along the first guide rod. These jaws are positioned by two opposed rocker arms, each of which is mounted to a cross brace which slides along the second guide rod. The rocker arms are symmetrically positioned by a link mechanism which also slides along the second guide rod and by a hydraulic cylinder coupled between the two rocker arms. The frame is pivotably mounted to a pipe boom so as to rotate about an axis parallel to the clamped pipe and transverse to the first and second guide rods.

U.S. Pat. No. 4,650,237 issued on Mar. 17, 1987 to R. J. Lessway, provides an automatic centering and gripping apparatus which includes a housing in which is slidably mounted on a longitudinal movable operator body. A pair of gripper arms is slidably mounted on the operator body. Each gripper arm carries a gripper member engageable with a workpiece. The gripper members are moved longitudinally and laterally into gripping engagement with a workpiece when the operator body is moved in one longitudinal direction. They are correspondingly disengaged from the workpiece when the operator body is moved in the other longitudinal direction.

U.S. Pat. No. 5,609,226 issued on Mar. 11, 1997 to D. J. Penisson, teaches a slip-type gripping assembly having an outer body defining a longitudinal through opening for receipt of the object. A number of slip bodies are circumferentially spaced about the through opening and are radially movable toward and away from the locus of the object. Each slip body is pivotable about a generally longitudinal axis and generally circumferentially centered with respect to the slip body as well as about a tangential axis. A respective force transfer formation is cooperative between each slip body and the outer body for transferring radial force therebetween while permitting the pivoting.

U.S. Pat. No. 5,848,647, issued on Dec. 15, 1998 to Webre et al., shows a pipe gripping apparatus for angularly adapting two misaligned pipes on one or more pipe strings. The apparatus has a housing having internal, opposing downwardly-curved surfaces therein and forming a longitudinal opening for passing a portion of at least one tubing string therethrough. A plurality of slip carriers each has an exterior surface contoured to match the downwardly curved surface and has a downwardly inclined interior surface. Each slip carrier is in movable connection with one of the curved surfaces of the housing. A plurality of slips has downwardly inclined exterior surfaces and longitudinal channels formed on an internal surface for holding gripping elements for gripping a portion of the pipe.

U.S. Pat. No. 5,992,801, issued on Nov. 30, 1999 to C. A. Torres, discloses a pipe gripping assembly and method. This pipe gripping assembly has a primary pipe gripping mechanism and a backup and a secondary pipe gripping mechanism carried in a single tapered slip bowl. The primary gripping mechanism employs smooth surface pipe dies that set against and grip and hold the pipe without damaging the pipe surface. After the primary mechanism is set, toothed dies in the secondary gripping mechanism are automatically engaged with the pipe with only a minimal pipe gripping force. Additional slippage of the pipe through the smooth dies sets the toothed dies down against a wedging surface to grip and hold the pipe to stop its downward movement. A resilient biasing device is used to urge the toothed dies away from the pipe before the smooth dies are set.

U.S. Pat. No. 5,993,140, issued on Nov. 30, 1999 to A. Crippa, shows an apparatus for loading pipes onto processing machines. This apparatus has a handler arm with a first segment and a second segment disposed in succession. Kinematic members are adapted to determine a fixed ratio between the rotation angles of the segments about the respective hinging axes.

U.S. Pat. No. 6,543,551, issued Apr. 8, 2003 to Sparks et al., discloses an automatic pipe handling device which includes a support frame mounted on a boring device. Removable pipe racks can be placed in position on the support frame to deliver pipe to the spindle axis or to remove pipe therefrom as required. The pipe sections are removed from the pipe rack and positioned on the spindle axis by pipe grippers mounted on hydraulic cylinders mounted on a rotating longitudinal shaft. The grippers and shaft simultaneously return the used pipe sections for storage to the pipe rack.

U.S. Pat. No. 6,543,555, issued on Apr. 8, 2003 to M. Casagrande, provides an automatic loader for drill rods adapted to be used in association with a boring machine. The automatic motor has a store containing a plurality of drill rods and a movement assembly that is able to selectively remove, one at a time, the drill rods from the store to position them on the guide and drive assembly. The movement assembly is arranged in an intermediate position between the store and the guide and drive assembly so as to not interfere with the latter during the removal of the drill rods from the store.

U.S. Pat. No. 6,845,814, issued on Jan. 25, 2005 to Mason et al., teaches a pipe-gripping structure having load rings. In particular, a rotary slip supports a drill string having a plurality of slip segments connected to define an opening for insertion of the drill string. Each slip segment has a head region, a toe region, and an inner radial surface axially extending between the head and toe regions. The inner radial surface of each slip segment comprises a circumferential groove. A plurality of axially aligned drill string gripping inserts is attached to each slip segment between the head region and the circumferential groove. Each insert has a gripping surface for contacting the drill string.

U.S. Pat. No. 7,055,594, issued on Jun. 6, 2006 to Springett et al., describes a pipe gripper and top drive system in which the pipe gripping system is located beneath the top drive unit. The pipe gripping system has an open throat for receiving a tubular to be gripped by the pipe gripping system. The gripping system has a body with first and second jaws movably connected thereto and a piston/cylinder assembly movably interconnected with each jaw for moving the jaws to clamp and then to rotate the pipe.

U.S. Pat. No. 7,090,035, issued on Aug. 15, 2006 to G. Lesko, describes a method and system for connecting pipe to a top drive motor. This system includes a top drive motor that tilts about a horizontal axis and a pipe launcher that brings joints of pipe up to the drilling platform for connection with a top drive motor at a safe and convenient height above the platform. The top drive motor further includes a clamping assembly that grasps and pulls the joint of the pipe to the motor as the connection is being made. The clamp assembly supports the motor-pipe connection as the top-drive motor is raised in the drilling mast of the rig bringing the joint of pipe up into a vertical orientation for connection with the drill tubing string.

U.S. Pat. No. 7,121,166 B2, issued on Oct. 17, 2006 to Drzewiecki, discloses a tong assembly that has a body and a center member slidable relative to the body. A pair of clamping arms is rotatably connected to the body. The clamping arms are connected to the center member such that as the center member slides relative to the body, the clamping arms rotate relative to the body. The assembly also comprises a plurality of die assemblies, wherein at least one die assembly is mounted to each clamping arm and at least one die assembly is mounted to the center member.

U.S. patent application Ser. No. 12/111,907, filed on Apr. 29, 2008 by the present inventor, discloses a pipe gripping apparatus that has a first jaw with a pipe-contacting surface at one end thereof, a second jaw having a pipe-contacting surface at one end thereof, a tongue having a pipe-contacting surface at one end thereof, and an actuator connected to the first and second jaws and to the tongue. The actuator serves to move the first and second jaws and the tongue such that the pipe-contacting surfaces thereof move radially inwardly simultaneously for a substantially identical distance. A first link pivotally connects the tongue with the first jaw. A second link pivotally connects the tongue with the second jaw. The first and second links extend angularly outwardly from the tongue. The first and second pivot points of each jaw have a distance unequal to a distance between the first pivot point and pipe-contacting surface of each jaw. The pipe-contacting surfaces can be elastomeric pads, toothed dies, or rollers.

A problem associated with using the pipe gripping apparatus disclosed in U.S. patent application Ser. No. 12/111,907 is that a large load is imparted onto the outer surface of the pipe by the jaws of the apparatus. The large load is sustained by the actuator of the apparatus; however, the piston and cylinder of the actuator can prematurely fail due to constant application of the load of gripping to the pipe. Thus, there is a need for a gripping apparatus that reduces the load on the piston and cylinder of the actuator so as to increase the useful life thereof and avoid early fatigue and failure.

Various patents have issued relating to the loads exerted by a gripping apparatus. For example, U.S. Pat. No. 6,279,662, issued on Aug. 28, 2001 to Sonnier, discloses a conventional center-latch elevator with smooth slip segments of the present invention which is employed to grip and suspend a pipe without damaging the pipe surface. The slip segments are made of aluminum or another material that is softer than the material of the pipe. The elimination of rough surfaces on the slip segments prevents damage to the external pipe surface. A threaded lift connector is secured to the box end of the pipe to be lifted. The lift connector forces spring-loaded slip segments down into the conical bowl of the elevator to move the segments radially inwardly into gripping engagement with the pipe. The axial forces exerted by the elevator against the bottom of the lift connector are transmitted through the connector to the threads engaged in the pipe.

U.S. Pat. No. 4,869,137, issued on Sep. 26, 1989 to Slator, discloses an improved jaw construction for power tongs and bucking units wherein the jaws include a pair of gripping pads which are mounted to the jaws with a resilient insert so that loads applied through the jaw to the pipe are distributed over the gripping pads to minimize scoring the pipe or deformation thereof.

It is an object of the present invention to remove the hydraulic cylinder of the actuator of a gripping apparatus from a load path.

It is another object of the present invention to increase the useful life of the actuator of a gripping apparatus.

It is another object of the present invention to lock the gripping apparatus around a tubular in the event of a loss of power to the gripping apparatus.

It is still another object of the present invention to use the gripping power of a gripping apparatus for other purposes, such as rotating tubulars, while the gripping apparatus holds a tubular.

It is another object of the present invention to provide a tubular gripping apparatus that can be used as a tong.

It is another object of the present invention to provide a tubular gripping apparatus whereby different diameters of tubular can be gripped by the same mechanism.

It is another object of the present invention to provide a tubular gripping apparatus which self-centers the tubulars regardless of the diameter of the tubular.

It is another object of the present invention to provide a tubular gripping apparatus which includes a locking mechanism so as to prevent unintended release of the tubular.

It is still another object of the present invention to provide a tubular gripping apparatus that can be used in conjunction with a tubular handling device.

It is another object of the present invention to provide an apparatus to grip and to center any shape having three surfaces with the same radius to the center of the shape.

It is another object of the present invention to provide an apparatus to grip and to center any shape, having a mechanism/assembly for variable locking of the shape.

It is still another object of the present invention to provide an apparatus to grip and to center any shape, clamping with a greater force than the actuator.

It is another object of the present invention to provide an apparatus to grip with zero centering error for any two tubular diameters.

It is another object of the present invention to use three points of contact for gripping a tubular.

It is another object of the present invention to have an infinitely variable brake position.

It is another object of the present invention to multiply the gripping force of the gripping apparatus so as to enhance the load delivered by the cylinder of the actuator.

It is another object of the present invention to lock the jaws of a gripping apparatus around a tubular.

It is still another object of the present invention to avoid elastic and plastic deformation of a tubular while gripping.

It is another object of the present invention to distribute the contact pressure of the gripper apparatus over the surface of the tubular.

It is another object of the present invention to provide a tubular gripping apparatus with a single actuator with a single degree of freedom.

It is another object of the present invention to move the tubular to the gripper.

These and other objects and advantages of the present invention will become apparent from a reading of the attached specification and appended claims.

BRIEF SUMMARY OF THE INVENTION

The present invention is a tubular gripping apparatus comprising a jaw assembly having a tubular-contacting surface at an end thereof, a drive yoke having a tubular-contacting surface at an end thereof, an actuator connected to the drive yoke, and a locking assembly interconnected to the drive yoke. The drive yoke is connected to the jaw assembly. The actuator moves the jaw assembly and the drive yoke such that the tubular-contacting surfaces thereof move radially inwardly for a substantially identical distance. The locking assembly directs a load away from the actuator while the jaw assembly and the drive yoke grip the tubular.

The actuator comprises a piston-and-cylinder assembly connected to the drive yoke. The drive yoke has at least one bearing bar thereon. The locking assembly is adjacent the bearing bar. The apparatus further comprises a housing connected to the actuator and the locking assembly. The locking assembly and the drive yoke and the actuator and the jaw assembly have a first position and a second position.

The locking assembly comprises a cylinder yoke positioned around the piston-and-cylinder assembly, and a wedge assembly positioned adjacent the bearing bar. The cylinder yoke has a nose positioned adjacent the drive yoke. The wedge assembly is positioned adjacent the cylinder yoke. The wedge assembly is suitable for contacting the cylinder yoke so as to prevent a movement of the cylinder yoke.

The wedge assembly comprises a pair of clamping wedges positioned adjacent the bearing bar and adjacent the nose of the cylinder yoke, a braking plate having an end adjacent the pair of clamping wedges, a first braking wedge positioned adjacent a side of the braking plate, a second braking wedge positioned adjacent an opposite side of the braking plate, a first brake pad positioned adjacent a side of the first braking wedge opposite the braking plate, a second brake pad positioned adjacent a side of the second braking wedge opposite the braking plate, a first brake shoe positioned adjacent a side of the first brake pad opposite the first braking wedge, a second brake shoe positioned adjacent a side of the second brake pad opposite the second braking wedge, a first spring connected to one of the pair of clamping wedges and to the first brake pad, a second spring connected to another of the pair of clamping wedges and to the second brake pad, a third spring connected to the first braking wedge and to the housing, and a fourth spring connected to the braking plate and to the housing. The braking plate has an indentation formed in the end. The nose of the cylinder yoke is positioned in the indentation when in the first position. The nose of the cylinder yoke has a detent. The detent extends within the indentation of the braking plate when the locking assembly is in the first position. The detent is positioned adjacent a side of the pair of clamping wedges opposite the braking plate when the locking assembly is in the second position. Each of the pair of clamping wedges has a trapezoidal shape.

The first spring is suitable for urging one of the pair of clamping wedges toward the other of the clamping wedges. The second spring is suitable for urging the other of the clamping wedges toward the one of the clamping wedges. The third spring is suitable for urging the first braking wedge toward the drive yoke. The fourth spring is suitable for urging the braking plate toward the drive yoke. The pair of clamping wedges and the braking plate and the first and second braking wedges and the first and second brake pads and the first and second brake shoes are coplanar. The cylinder yoke has a portion extending through an interior of the drive yoke.

The jaw assembly comprises a first jaw having a pipe-contacting surface at one end thereof, and a second jaw having a pipe-contacting surface at one end thereof. The drive yoke is connected to the first jaw and to the second jaw. A first link is connected to tubular first jaw and to tubular drive yoke. The first link is pivotally connected at a first pivot point to tubular first jaw. The first link is pivotally connected at a second pivot point to tubular drive yoke. A second link is connected to tubular second jaw and to tubular drive yoke. The second link is pivotally connected at a first pivot point to tubular second jaw. The second link is pivotally connected at a second pivot point to tubular drive yoke. The first link is between tubular first jaw and tubular drive yoke. The second link is between tubular second jaw and tubular drive yoke.

The present invention is a tubular gripping apparatus having a first position and a second position comprising a housing, a jaw assembly positioned adjacent the housing, a drive yoke connected to the jaw assembly, a piston-and-cylinder assembly connected to the drive yoke and to the housing, a cylinder yoke positioned around the piston-and-cylinder assembly, and a wedge assembly positioned adjacent the drive yoke. The cylinder yoke has a nose positioned adjacent the drive yoke. The wedge assembly is positioned adjacent the cylinder yoke. The wedge assembly is suitable for contacting the cylinder yoke so as to prevent a movement of the cylinder yoke. The nose of the cylinder yoke is positioned within the wedge assembly when in the first position. The nose of the cylinder yoke is positioned outside the wedge assembly when in the second position.

The wedge assembly comprises a pair of clamping wedges positioned adjacent a bearing bar of the drive yoke, a braking plate having an end adjacent the pair of clamping wedges, a first braking wedge positioned adjacent a side of the braking plate, a second braking wedge positioned adjacent an opposite side of the braking plate, a first brake pad positioned adjacent a side of the first braking wedge opposite the braking plate, a second brake pad positioned adjacent a side of the second braking wedge opposite the braking plate, a first brake shoe positioned adjacent a side of the first brake pad opposite the first braking wedge, a second brake shoe positioned adjacent a side of the second brake pad opposite the second braking wedge, a first spring connected to one of the pair of clamping wedges and to the first brake pad, a second spring connected to another of the pair of clamping wedges and to the second brake pad, a third spring connected to the first braking wedge and to the housing, and a fourth spring connected to the braking plate and to the housing. The cylinder yoke has a portion extending through an interior of the drive yoke. The pair of clamping wedges is positioned adjacent the nose of the cylinder yoke. The braking plate has an indentation formed in the end. The nose of the cylinder yoke is positioned in the indentation when in the first position.

DETAILED DESCRIPTION OF THE INVENTION

Figure 1:
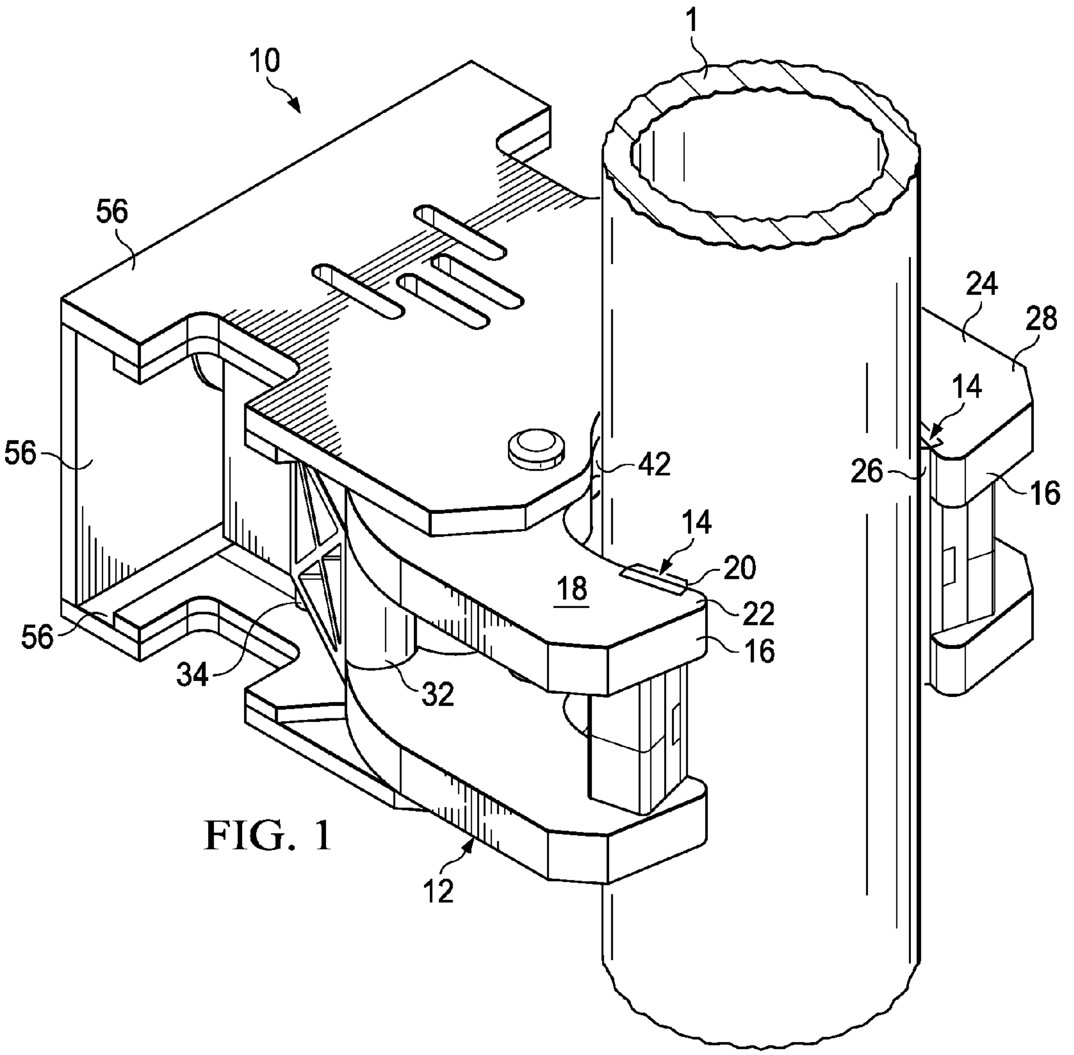
FIG. 1 shows a perspective view of the preferred embodiment of the tubular gripping apparatus of the present invention in the second position.

Referring to FIG. 1, there is shown a perspective view of the preferred embodiment of the tubular gripping apparatus 10 in the second position. In the second position, the apparatus 10 grips tubular 1. As can be seen in FIG. 1, the tubular gripping apparatus 10 has a jaw assembly 12 positioned around the outer surface of the tubular 1. The jaw assembly 12 has tubular gripping surfaces 14 on the end 16 thereof. The tubular gripping surfaces 14 contact the tubular 1 when the apparatus 10 is in the second position. The tubular gripping apparatus 10 has a housing 56. The housing 56 covers the top, back, and bottom of the apparatus 10. The jaw assembly 12 has a portion that moves within the housing 56. The unique configuration of the jaw assembly 12 allows the apparatus 10 of the present invention to grip large and small diameters of tubulars without having to change the jaws of the jaw assembly 12. Thus, the apparatus 10 of the present invention eliminates the need for additional adapters and thus removes the associated costs from gripping tubulars 1.

The jaw assembly 12 has a first jaw 18 and a second jaw 24. The first jaw 18 has a pipe-contacting surface 20 at one end 22 thereof. The second jaw 24 has a pipe-contacting surface 26 at one end 28 thereof. The first and second jaws 18 and 24 are connected to a drive yoke 42. A first link 30 is connected to the first jaw 18 and the drive yoke 42. The first link 30 is pivotally connected at a first pivot point 32 to the first jaw 18. The first link 30 is pivotally connected at a second pivot point 34 to the drive yoke 42. A second link 36 is connected to the second jaw 24 and to the drive yoke 42. The second link 36 is connected at a first pivot point 38 to the second jaw 24. The second link 36 is pivotally connected at a second pivot point 40 to the drive yoke 42. An elastomeric pad is the pipe-contacting surface 20 of the first jaw 18. As such, the pipe-contacting surface 20 is slightly flexible so as to avoid any damage to the outer surface of the tubular 1. An elastomeric pad is the pipe-contacting surface 26 of the second jaw 24. The links 30 and 36 assure that there is a proper movement of the jaws 18 and 24 radially inwardly relative to the movement of the drive yoke 42. The links 30 and 36 are anchored to housing 56.

Figure 2:
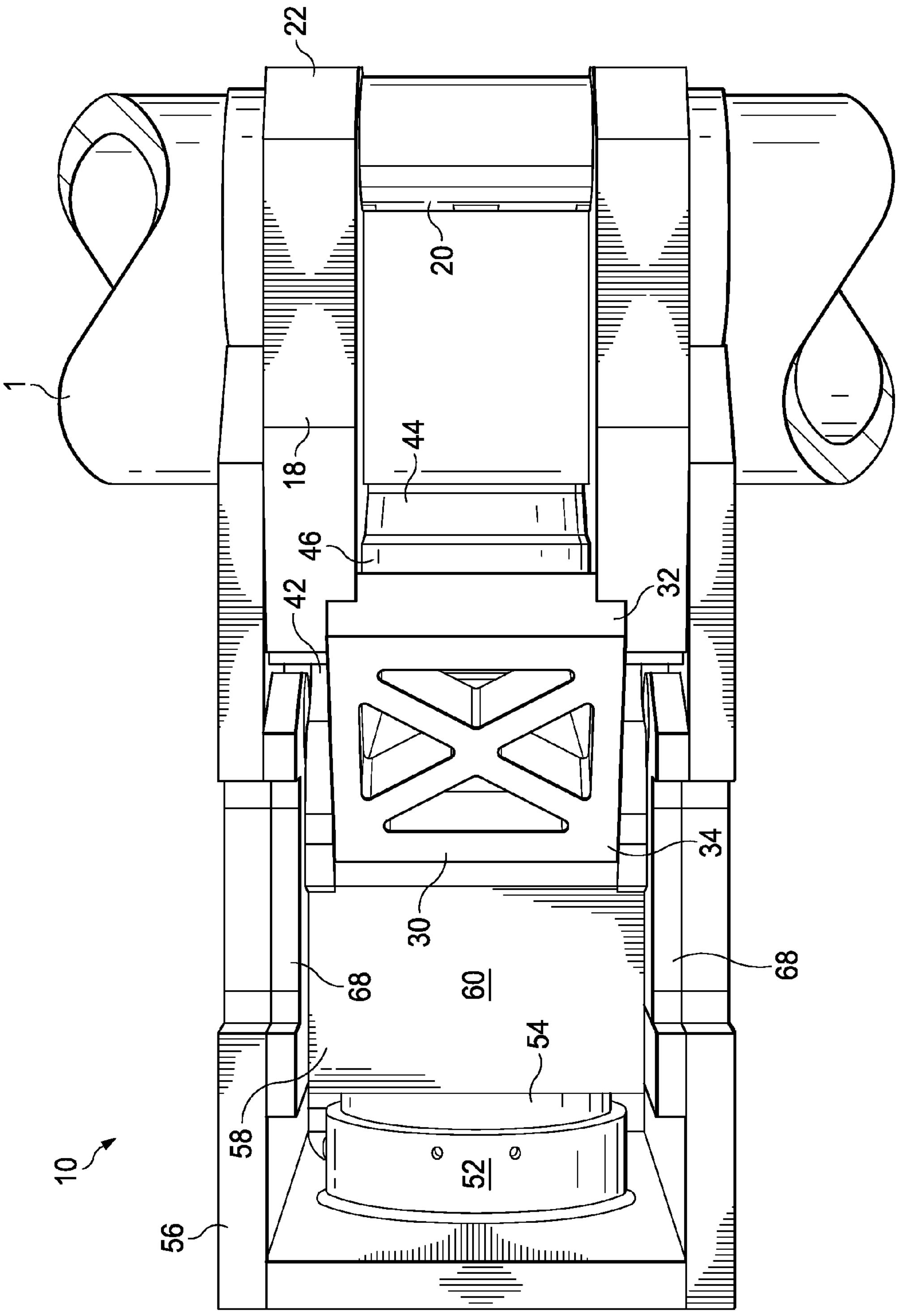
FIG. 2 shows a side elevational view of the preferred embodiment of the tubular gripping apparatus of the present invention in the second position.

Referring to FIG. 2, there is shown a side elevational view of the tubular gripping apparatus 10 in the second position. The apparatus 10 holds the tubular 1 when in the second position. The first link 30 can be seen attached to the first jaw 18 of the jaw assembly 12. The apparatus 10 has a drive yoke 42. The drive yoke 42 also has a tubular-contacting surface 44 at one end 46 thereof. The first link 30 is connected to the first jaw 18 and to the drive yoke 42. The first link 30 is pivotally connected to the first jaw 18 at the first pivot point 32. The first link 30 is pivotally connected to the drive yoke 42 at the second pivot point 34. The first link 30 is positioned between the first jaw 18 and the drive yoke 42. The second link (not shown) is in an identical arrangement with the second jaw (not shown) and the drive yoke 42.

An actuator 52 is interconnected to the first jaw 18, to the second jaw 24 and to the drive yoke 42 so as to move the tubular-contacting surfaces 20, 26 and 44 radially inwardly and simultaneously for an identical distance. The drive yoke 42 is generally an elongated longitudinal member extending toward the tubular 1. An elastomeric pad is located on the end 46 of the drive yoke 42 as the tubular-contacting surface 44. The present invention contemplates that the pipe-contacting surfaces 20, 26, and 44 can be an elastomeric pad of a gripper, a toothed die of a tong, or a roller of a spinner.

Figure 3:
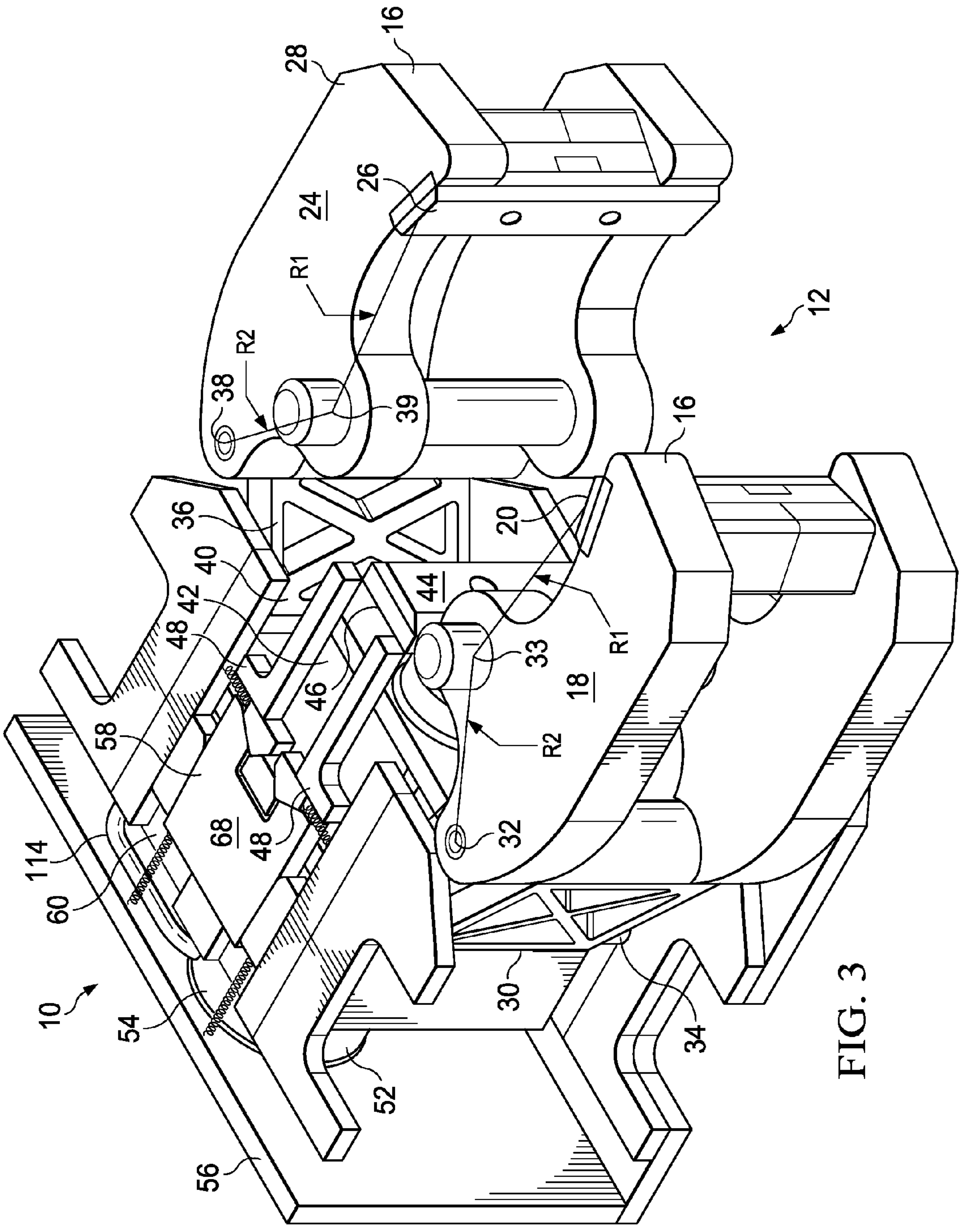
FIG. 3 shows an upper perspective view of the tubular gripping apparatus of the present invention in the first position, with the top of the housing removed.

Referring to FIG. 3, there is shown an upper perspective view of the tubular gripping apparatus 10 in the first position. Here, it can be seen that first jaw 18 has a first housing pivot 33. Second jaw 24 has a second housing pivot 39. The first and second housing pivots 33 and 39 allow the respective first and second jaws 18 and 24 to move toward or away from tubular 1 by pivoting about the housing pivots 33 and 39 relative to housing 56. In the first position, the jaws 18 and 24 are spread apart so as to release a tubular. That is, the jaws 18 and 24 of the jaw assembly 12 are open. When the jaws 18 and 24, along with the drive yoke 42, move toward the tubular 1, each of the tubular-contacting surfaces 20, 26 and 44 will contact the outer surface of the tubular 1 simultaneously. As such, the actuator 52 provides for the coordinated movement of the jaws 18 and 24 and the drive yoke 42. Each of the tubular-contacting surfaces 20, 26 and 44 moves radially inwardly simultaneously for an identical distance.

The actuator 52 has a piston-and-cylinder assembly 54. The piston-and-cylinder assembly 54 has a piston connected to the drive yoke 42 so as to move the drive yoke 42 in a direction toward the tubular 1 or in a direction away from the tubular 1. The piston-and-cylinder assembly 54 is a conventional hydraulic actuator. It can be seen that a hydraulic line 114 is connected to the piston-and-cylinder assembly 54 so as to deliver hydraulic fluid for the actuator 52 of the tubular gripping apparatus 10 of the present invention.

The first link 30 has a pivot point 32 at an end opposite pivot point 34. Likewise, the second link 36 has a pivot point 38 at an end opposite pivot point 40. As the drive yoke 42 moves toward the tubular 1, the links 30 and 36 cause the respective jaws 18 and 24 to rotate the pipe-contacting surfaces 20 and 26 inwardly toward the outer surface of tubular 1. If the diameter of tubular 1 is smaller, then the drive yoke 42 will move further toward the tubular 1 so as to cause the jaws 18 and 24 to rotate further inwardly. The movement of the drive yoke 42 causes the tubular-contacting surface 44 to contact the outer surface of tubular 1.

In using the pipe gripping apparatus of prior art, it was found that the clamping force exerted by the piston-and-cylinder assembly was continuous and would cause early wear, fatigue, and even failure in the gripping abilities of the prior art gripping apparatus. To alleviate this problem, the apparatus 10 of the present invention redirects the force of clamping away from the actuator 52 (i.e. the piston-and-cylinder assembly 54) so that the assembly 54 does not continuously bear the load of gripping a tubular 1. The redirection of the force of clamping is accomplished by the locking assembly 58 of the apparatus 10 of the present invention. Another feature of the apparatus 10 of the present invention is that, in the construction of the tubular gripping apparatus 10 of the present invention, it is very important that if there is a failure in the piston-and-cylinder assembly 54 of actuator 52, a failure in hydraulic power, or another sort of failure, that the tubular 1 remains firmly gripped by the jaws 18 and 24 of the jaw assembly 12 and the drive yoke 42. In the event of such a failure, the present invention is equipped with a locking assembly 58 which serves to prevent the unintended outward movement of the tubular-contacting surfaces 20, 26 and 44.

Referring still to FIG. 3, the drive yoke 42 has bearing bars 48 on a top thereof. A locking assembly 58 is positioned adjacent the bearing bars 48. The locking assembly 58 of the present invention includes a cylinder yoke 60 and a wedge assembly 68. The locking assembly 58 is interconnected to the drive yoke 42 so as to direct a load away from the actuator 52 while the first and second jaws and 24 of the jaw assembly 12 are in the second position. The cylinder yoke 60 is positioned around the piston-and-cylinder assembly 54. The wedge assembly 68 is positioned adjacent the bearing bars 48. The wedge assembly 68 is also positioned adjacent the cylinder yoke 60. The wedge assembly 68 is suitable for contacting the cylinder yoke 60 so as to prevent a movement of the cylinder yoke 60. More particularly, the wedge assembly 68 contacts the cylinder yoke 60 so that the cylinder yoke 60 does not move backwards away from the drive yoke 42. The housing 56 is connected to the actuator 52 and to the locking assembly 58. As a result of the construction of the locking assembly 58, if there is a failure in the hydraulics associated with the piston-and-cylinder assembly 54, or any other problem affecting the integrity of tubular gripping apparatus 10, the wedge assembly 68 will bear against the bearing bars 48 so as to cause the surfaces of the wedges of the wedge assembly 68 to engage and stop any backward movement of the cylinder yoke 60. As a result, the tubular-contacting surfaces 20, 26 and 44 will remain properly urged against the outer surface of tubular 1.

A novel aspect of the apparatus 10 of the present invention is that a variety of tubular diameters can be utilized without the need to change the jaws 18 and 24 of the gripping apparatus 10. The present invention automatically grips different diameters of pipe while, at the same time, assuring a centering of such pipes with minimal error. The jaws 18 and 24 have two important measurements, R1 and R2. R1 is the distance between housing pivots 33 and 39 and the pipe-contacting surfaces 20 and 26 of the first and second jaws 18 and 24, respectively. R2 is the distance between the first pivot points 32 and 38 of the first and second links 30 and 36, and the housing pivots 33 and 39 of the first and second jaws 18 and 24, respectively.

In the apparatus 10, distance R1 is not equal to R2. Prior art is limited in that it requires R1 to equal R2. For example, the prior art gripping apparatus of U.S. Pat. No. 7,121,166 B2 has R1 equal to R2. Having R1 not equal to R2 in the present invention allows the present invention to grip different diameters of tubulars while simultaneously centering with minimal error. Any number of customized variations of tubular diameter ranges can be accommodated by geometrically solving for the optimum size of links 30 and 36 and appropriately sizing the distances R1 and R2 of the jaws 18 and 24 so as to provide the best mechanical advantage for the space available. Sizing the apparatus 10 of the present invention in this manner allows the apparatus 10 to grip with zero centering error for any two tubular reference diameters and nearly zero error for any tubular diameter between the reference diameters and just less than the smaller reference diameter and just more than the larger reference diameter. The prior art gripping apparatus of U.S. Pat. No. 7,121,166 B2 has zero error at only one pipe diameter, whereas the apparatus 10 of the present invention achieves zero centering error for any two tubular diameters. The present invention contemplates that any range of diameters would have a large diameter that is several times the value of the small diameter, and wherein this range of tubular diameters would have exactly zero centering error for at least two specific sizes of pipe. The present invention also is unlimited in the geometry relative to the distances R1 and R2. That is, R1 and R2 can be any values where R1 is not equal to R2.

Another important and novel feature of the present invention is the orientation of the links 30 and 36. First link 30 is pivotally connected to the drive yoke 42 at second pivot point 34. Link 30 angles outwardly to first pivot point 32, where the first link 30 is pivotally connected to the first jaw 18. Likewise, the second link 36 is pivotally connected to the drive yoke 42 at second pivot point 40 and angles outwardly to first pivot point 38, where the second link 36 is pivotally connected to the second jaw 24. The outward angle of links 30 and 36 uses less space than prior art gripping apparatuses that have links extending parallel to the length of the gripper. Thus, the apparatus 10 of the present invention can be used in smaller spaces than prior art gripping apparatus. The links 30 and 36 move both laterally and longitudinally, as opposed to only longitudinally.

When it is desired to release the tubular 1, it is only necessary for the piston-and-cylinder assembly 54 of actuator 52 to move rearwardly. This serves to cause the tubular-contacting surfaces 20, 26 and 44 of the first jaw 18, second jaw 24, and drive yoke 42, respectively, to move radially outwardly away from the outer surface of the tubular 1 so as to properly release the tubular 1 in a desired location. Further movement of the piston-and-cylinder assembly 54 of the actuator 52 rearwardly of the apparatus 10 will cause the jaws 18 and 24, along with the drive yoke 42, to move the tubular-contacting surfaces 20, 26 and 44 further away from each other so that this opening will allow the introduction of another tubular 1. Through the use of the present invention, a variety of tubular diameters can be utilized without the need to change the gripping apparatus 10. The apparatus 10 of the present invention automatically grips different diameters of tubular while, at the same time, assuring a proper centering of such tubulars. The size of the links 30 and 36, along with the relationship between the respective pivot points 32, 34, 38, and 40, is engineered so as to assure such simultaneous movement.

Figure 4:
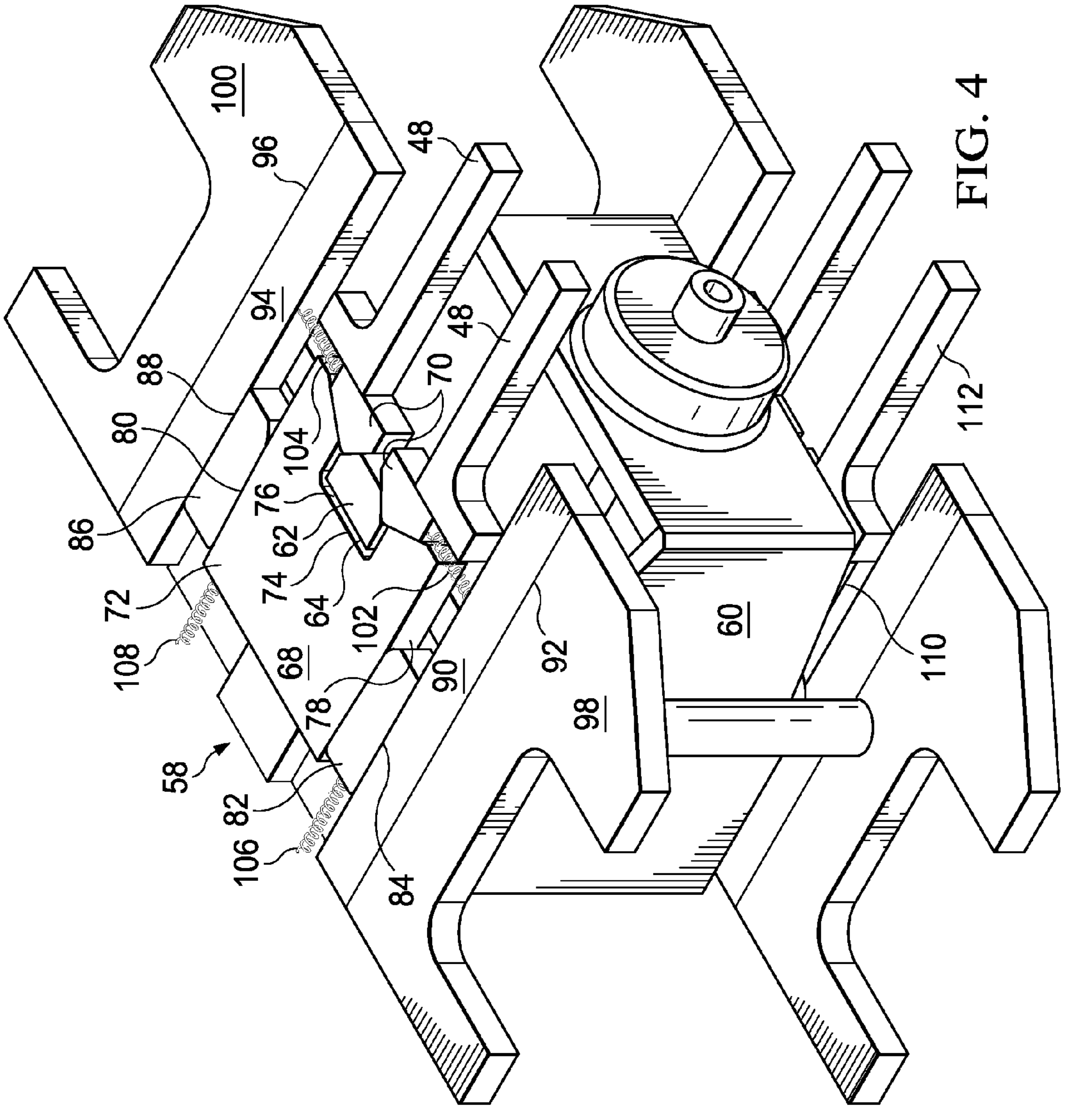
FIG. 4 is an isolated perspective view of the locking assembly of the tubular gripping apparatus of the present invention.

Referring to FIG. 4, there is shown an isolated perspective view of the preferred embodiment of the locking assembly 58 of the apparatus 10 of the present invention. The locking assembly 58 has a cylinder yoke 60 and a wedge assembly 68. As FIG. 4 shows, a second locking assembly 110 can be included in the apparatus 10 of the present invention. In the event a second locking assembly 110 is included, a second set of bearing bars 112 would be positioned on the bottom of the drive yoke 42. The locking assembly 58 has a pair of clamping wedges 70 positioned adjacent bearing bars 48. Each of the clamping wedges 70 may be pentagonal in shape. The cylinder yoke 60 has a nose 62 on an end thereof adjacent the drive yoke 42. A braking plate 72 has an end 74 adjacent the clamping wedges 70. The braking plate 72 has an indentation 76 form in the end 74 thereof. The nose 62 of the cylinder yoke 60 is positioned in the indentation 76 when the apparatus 10 is in the first position. The locking assembly 58 in FIG. 4 is thus in the first position. A first braking wedge 82 is positioned adjacent a side 78 of the braking plate 72. A second braking wedge 86 is positioned adjacent an opposite side 80 of the braking plate 72. A first brake pad 90 is positioned adjacent a side 84 of the braking wedge 82 opposite the braking plate 72. A second brake pad 94 is positioned adjacent a side 88 of the braking wedge 86 opposite the braking plate 72. A first brake shoe 98 is positioned adjacent a side 92 of the first brake pad 90 opposite the first braking wedge 82. A second brake shoe 100 is positioned adjacent a side 96 of the second brake pad 94 opposite the second braking wedge 86. A first spring 102 is connected to one of the pair of clamping wedges 70 and to the first brake pad 90. A second spring 104 is connected to another of the pair of clamping wedges 70 and to the second brake pad 94. A third spring 106 is connected to the first braking wedge 82 and to the housing 56. A fourth spring 108 is connected to the braking plate 72 and to the housing 56.

The nose 62 of the cylinder yoke 60 has a detent 64. The detent 64 extends within the indentation 76 of the braking plate 72 when the locking assembly 58 is in the first position. The detent 64 is positioned adjacent a side of the clamping wedges 70 when the locking assembly 58 is in the second position, as is described hereinbelow. The first spring 102 is suitable for urging one of the clamping wedges 70 toward the other of the clamping wedges 70. The second spring 104 is suitable for urging the other of the clamping wedges 70 toward the one of the clamping wedges 70. The third spring 106 is suitable for urging the first braking wedge 82 toward the drive yoke 42. The fourth spring 108 is suitable for urging the braking plate 72 toward the drive yoke 42. The pair of clamping wedges 70 and the braking plate 72 and the first and second braking wedges 82 and 86 and the first and second brake pads 90 and 94 and the first and second brake shoes 98 and 100 are all coplanar.

The clamping wedges 70, braking plate 72, and braking wedges 82 and 86 freely float above the cylinder yoke 60. The braking plate 72 is positioned adjacent other wedges, but is only connected to the fourth spring 108. The fourth spring 108 is in compression between the housing 56 and the braking plate 72. Thus, the fourth spring 108 urges the braking plate 72 toward the drive yoke 42. The first braking wedge 82 is positioned adjacent the braking plate 72 and the brake pad 90, but is only connected to the third spring 106. The third spring 106 is in compression between the housing 56 and the first braking wedge 82. Thus, the third spring 106 urges the first braking wedge 82 toward the drive yoke. The clamping wedges 70 are freely positioned adjacent the braking plate 72 and the bearing bars 48. The clamping wedges 70 are each connected to only a spring 102 and 104. Springs 102 and 104 are in compression between the brake pads 90 and 94 and the clamping wedges 70. As is described below, the wedges of the wedge assembly 68 move in response to a movement of the cylinder yoke 60.

Figure 5:
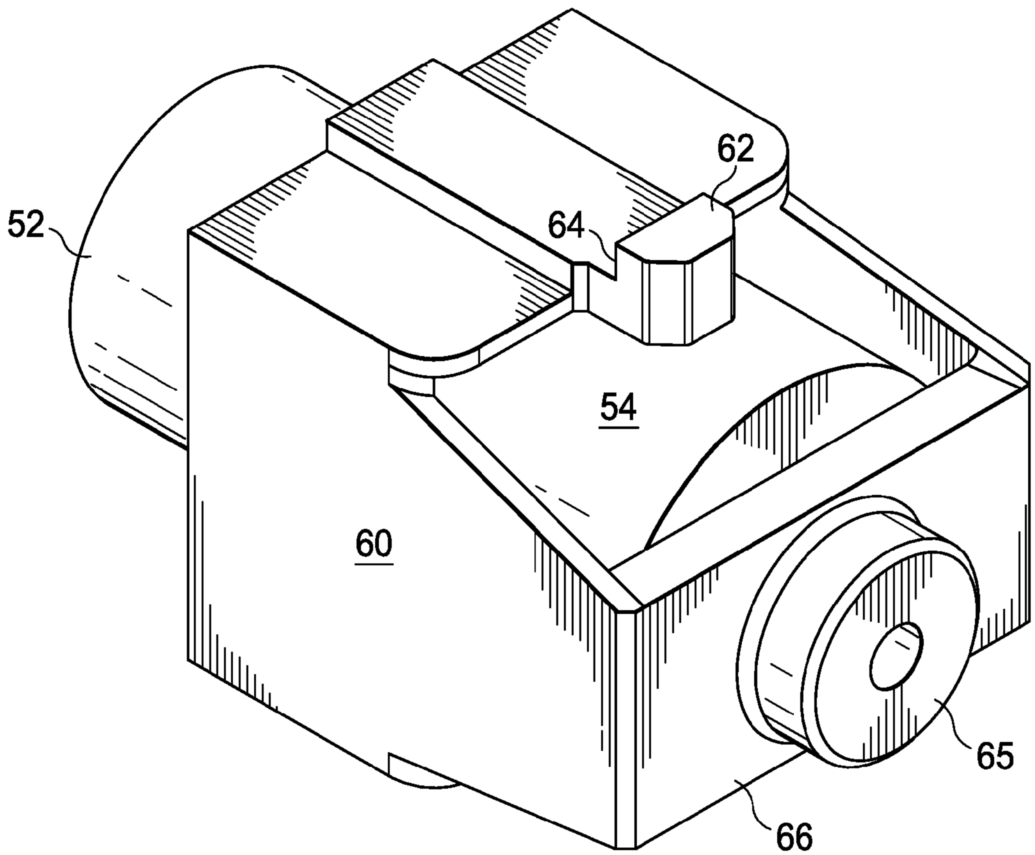
FIG. 5 is an isolated perspective view of the actuator and cylinder yoke of the tubular gripping apparatus of the present invention.

Referring to FIG. 5, there is shown an isolated perspective view of the cylinder yoke 60 positioned around the piston-and-cylinder assembly 54 of the actuator 52. The cylinder yoke 60 is attached to the piston of the piston-and-cylinder assembly 54. The nose 62 of the cylinder yoke 60 has a detent 64. The detent 64 provides a ledge that catches the clamping wedges 70 so as to prevent the cylinder yoke 60 from moving backwards away from a tubular 1 gripped by the apparatus 10. When the detent 64 is engaged with the clamping wedges 70, the load of gripping the tubular 1 is directed away from the piston-and-cylinder assembly 54 and into the clamping wedges 70 of the wedge assembly 68. A portion 66 of the cylinder yoke extends through the interior of the drive yoke 42. A protruding member 65 is attached to the piston of the piston-and-cylinder assembly 54. The protruding member 65 engages with the drive yoke 42 so as to push the drive yoke 42 forward and backward, which in turn opens and closes the jaws 18 and 24 of the jaw assembly 12. If a second locking assembly 110 is located on the bottom of the apparatus 10, as discussed as an optional feature in FIG. 4, the cylinder yoke 60 can have a second nose with a detent formed on the bottom of the cylinder yoke 60. The detent of the second nose would engage the wedge assembly of the second locking assembly in the same manner as described above for the nose 62 and wedge assembly 68. The piston-and-cylinder assembly 54 of the actuator 52 can be hydraulically actuated.

Figure 6:
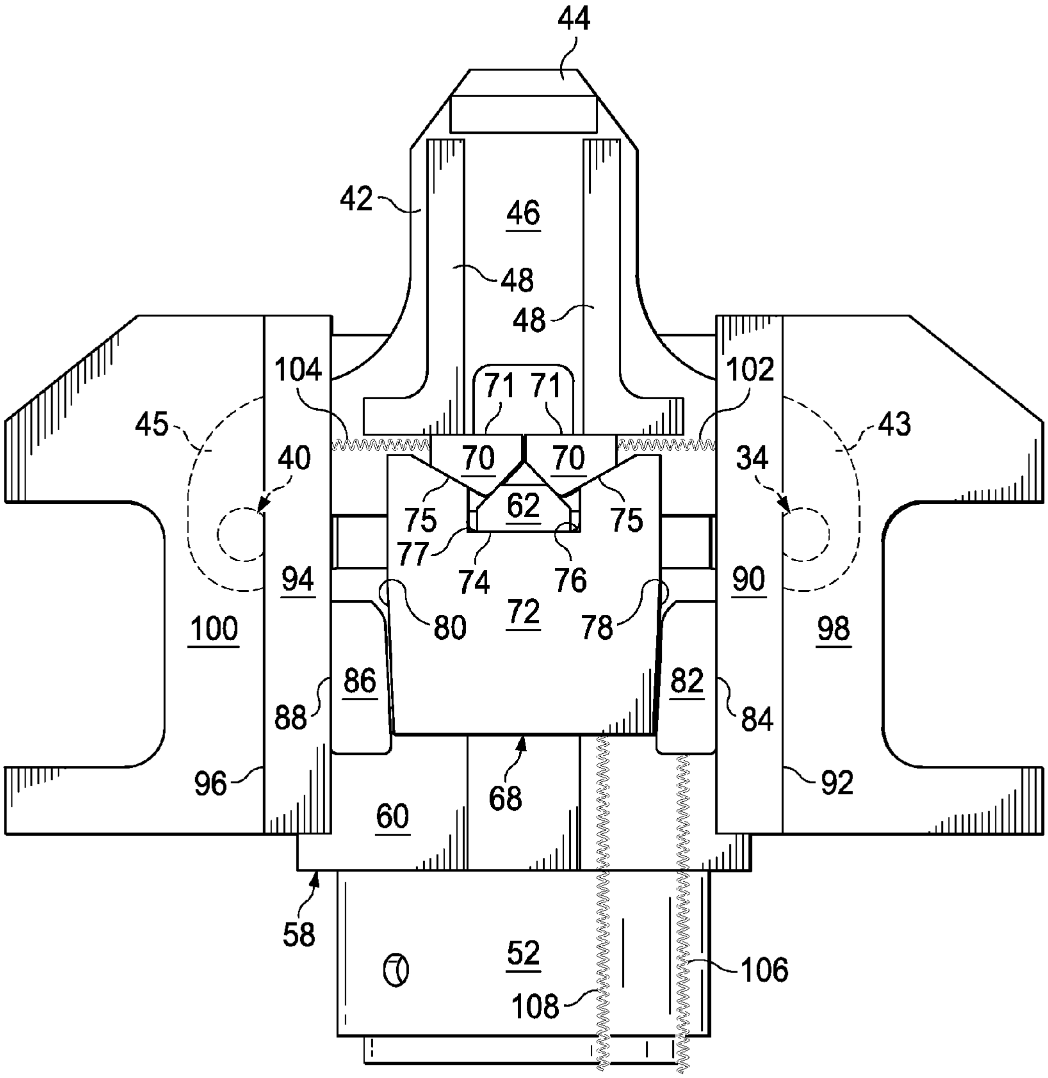
FIG. 6 is an isolated plan view of the locking assembly in the first position.

Referring to FIG. 6, there is shown a plan view of the locking assembly 58 of the apparatus 10 in the first position. In the first position, the piston of the actuator 52 is retracted so as to position the cylinder yoke 60 and the wedge assembly 68 of the locking assembly 58 over the actuator 52. The drive yoke 18 has outwardly extending surfaces 43 and 45, which are shown as dashed lines in FIGS. 6-9. In the first position, the load on the actuator 52 is minimal and the wedge assembly 68 receives little of the load. Spring 102 urges one of the pair clamping wedges 70 against the other of the pair of clamping wedge 70. Spring 104 urges the other of the clamping wedges 70 against the one of the clamping wedges 70. Thus, in the first position, the pair of clamping wedges 70 touch each other. The clamping wedges 70 are received in the indentation 76 of the braking plate 72. More particularly, each of the clamping wedges 70 is adjacent an angled portion 75 of the indentation 76, and a portion of each wedge 70 is in the rectangular portion 77 of the indentation 76. The angled portion 75 is tapered so as to match the taper of the clamping wedges 70. Thus, as the braking plate 72 and wedges 70 move with the cylinder yoke 60, the clamping wedges 70 slide accordingly along the angled portion 75 of the indentation 76. The side 71 of each of the clamping wedges 70 is adjacent the bearing bars 48. Sides 78 and 80 of the braking plate 72 are appropriately tapered so as to create a wedging action with the tapered sides of the first and second braking wedges 82 and 86, respectively. The sides 78 and 80 of the braking plate 72 are tapered adjacent the end of the braking plate 72 opposite end 74 where the indentation 76 is formed. Spring 108 urges the angled portion 75 of the braking plate 72 toward the clamping wedges 70. Spring 106 urges the first braking wedge 82 toward the drive yoke 42 so as to engage the tapered side 78 of the braking plate 72. The nose 62 of the drive yoke 60 resides in rectangular portion 77 of the indentation 76. The first and second brake pads 90 and 94 are stationary within the apparatus 10 and serve to distribute the wedging forces between the braking plate 72 and the first and second braking wedges 82 and 86 over a greater length. The brake pads 90 and 94 transmit any load forces to the brake shoes 98 and 100.

Figure 7:
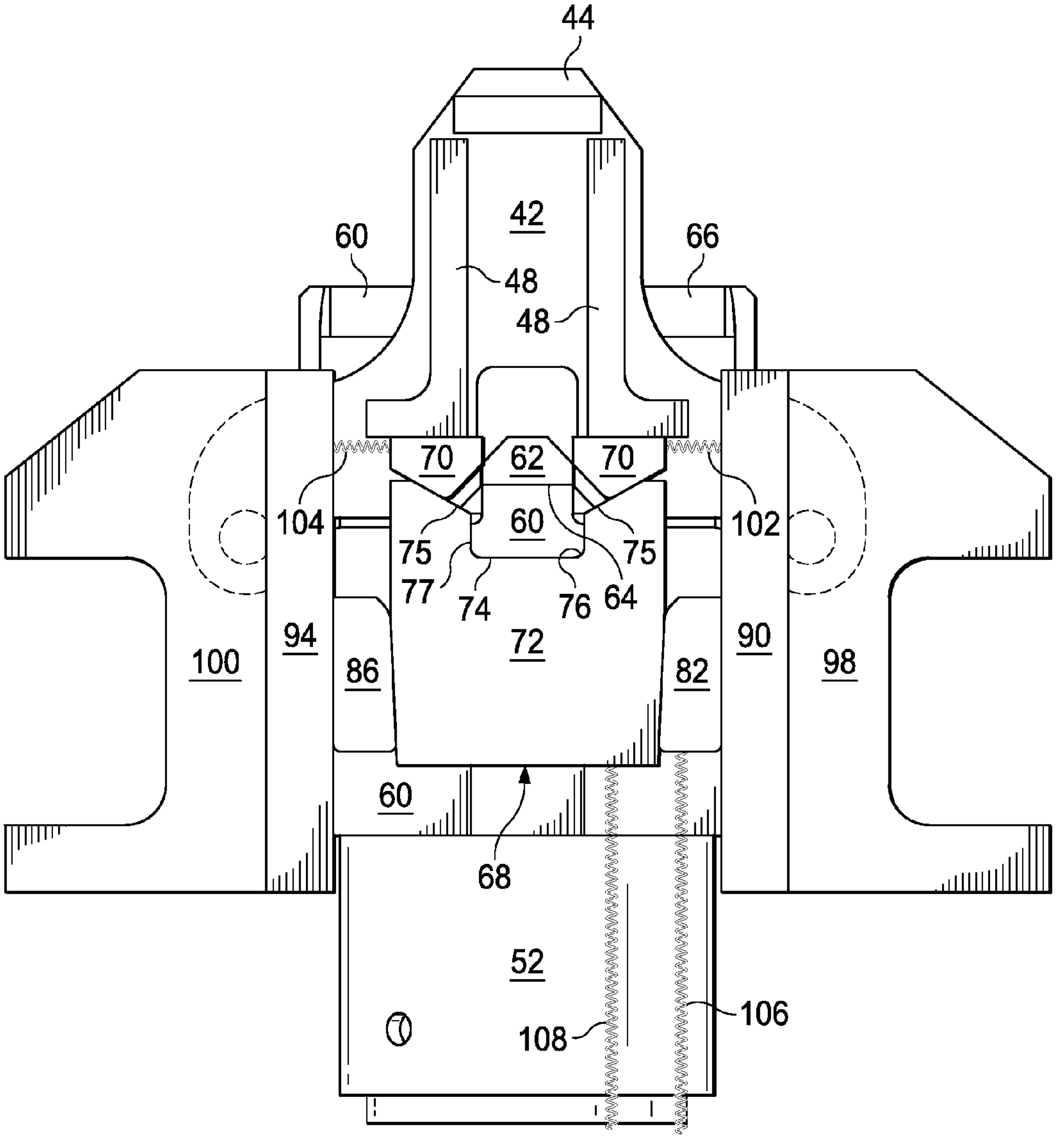
FIG. 7 is an isolated plan view of the locking assembly in an intermediate position.

Referring to FIG. 7, there is shown a plan view of the locking assembly 58 in an intermediate position between the first and second positions. The piston of the actuator 52 extends further out of the cylinder. Thus, the cylinder yoke 60 is closer to the drive yoke 42. The portion 66 of the cylinder yoke 60 is in the interior of the drive yoke 42. The actuator 52 has moved the cylinder yoke 60 forward relative to the braking plate 72. Spring 108 urges the braking plate 72 forward, but the space between the bearing bars 48 and the braking plate 72 has increased and the nose 62 of the cylinder yoke 60 is pushing the clamping wedges 70 outwardly so that they slide upwardly along the angled portion 75 of the indentation 76 of the braking plate 72.

Figure 8:
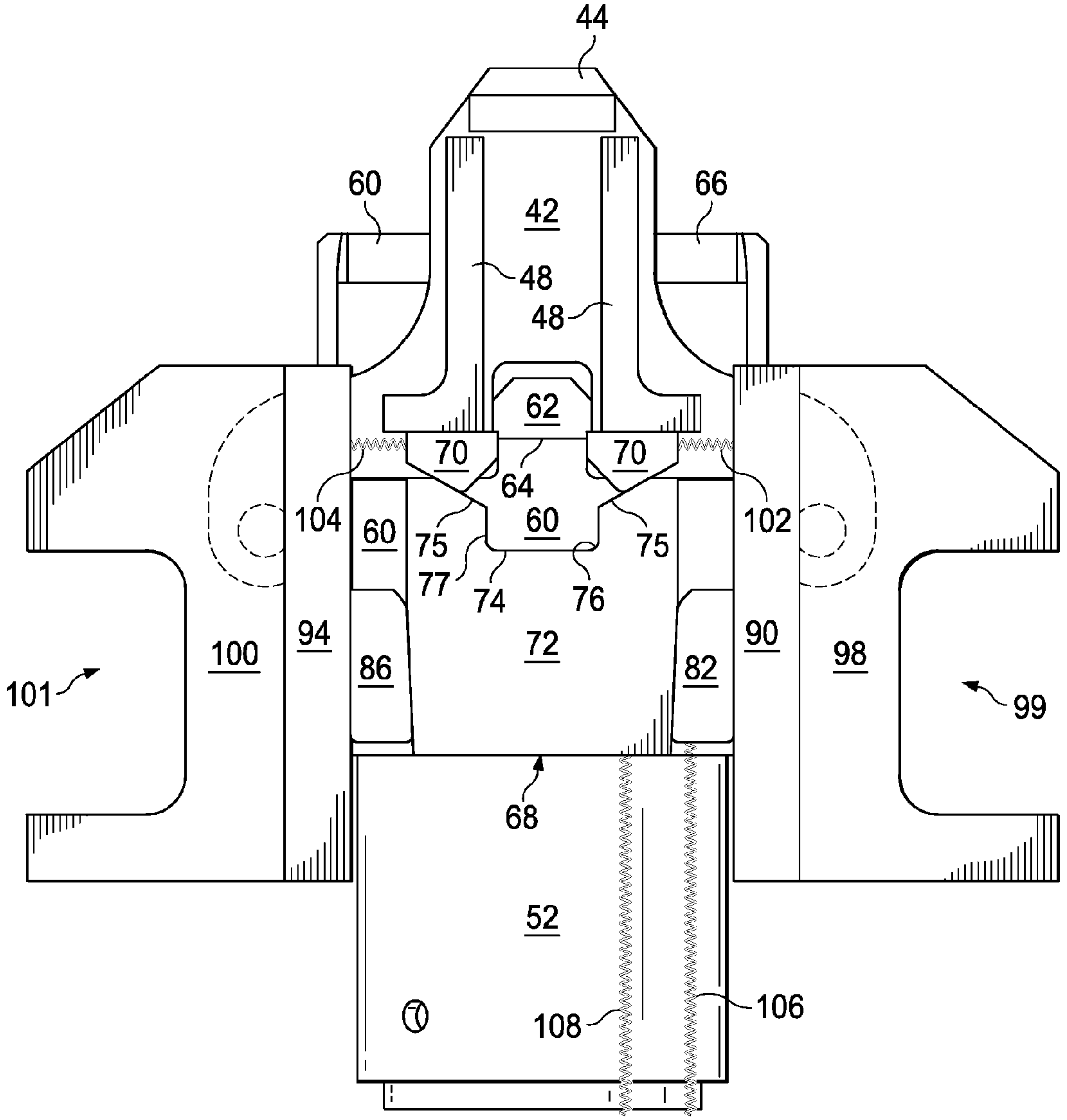
FIG. 8 is an isolated plan view of the locking assembly in the second position.

Referring to FIG. 8, there is shown a plan view of the locking assembly 58 in the second position. In the second position, the load of clamping the tubular 1 is directed away from the actuator 52 and into the wedge assembly 68. The clamping force between the tubular 1 and the tubular-contacting surface 44 of the drive yoke 42 is directed through the tubular-contacting surface 44 and into the drive yoke 42. The bearing bars 48, which are welded to the drive yoke 42, transmit the clamping force to the clamping wedges 70. The clamping wedges 70 transmit the force to the braking plate 72. The braking plate 72 directs the force in a transverse direction into the first and second braking wedges 82 and 86. The braking wedges 82 and 86 transmit the force to the first and second brake pads 90 and 94, respectively. The first and second brake pads 90 and 94 transmit the force to the first and second brake shoes 98 and 100, respectively. The brake shoes 98 and 100 are mounted within the housing 56 and absorb the clamping load that is channeled through the wedge assembly 68 of the locking assembly 58. By channeling the clamping force/load through the locking assembly 58, the force is directed away from the actuator 52 and increases the useful life of the actuator 52. Moreover, the locking assembly 58 provides a safety mechanism in the event that hydraulic power is lost to the apparatus 10 so that the jaws 18 and 24 of the jaw assembly 12 do not swing open and drop an extremely heavy tubular 1. The wedges of the wedge assembly 68 are coplanar and are kept from popping out of alignment by the top of the housing 56. The detent 64 of the nose 62 of the cylinder yoke 60 keeps the clamping wedges 70 from moving inwardly in response to forces exerted by springs 102 and 104. While the locking assembly 58 is locked, i.e. in the second position, hydraulic power that was used to clamp the apparatus 10 around the tubular 1 can be used for other applications.

The locking assembly 58 is unique in that it works for any size tubular 1 that is gripped by the jaw assembly 12. That is, the locking assembly 58 has an infinitely variable brake position. The taper of the clamping wedges 70 and the braking plate 72 allows more clamping force to be transmitted by the actuator 52 to the tubular 1 than would be allowed without the locking assembly 58 as part of the apparatus 10. The tubular-contacting surfaces 20, 26, and 44 can be used as a gripper, a tong, or a spinner. Appropriate surfaces can be substituted so as to accomplish a particular function of the surfaces 20, 26, and 44.

The brake shoes 98 and 100 have slots 99 and 101 formed therein, respectively. The slots 99 and 101 are formed in the brake shoes 98 and 100 so as to accommodate a rail extending therethrough for structural support of the tubular gripping apparatus 10. This is an optional feature of the design of the apparatus 10. If the apparatus 10 includes a second locking assembly, as discussed above, then another set of brake shoes would be positioned on the bottom of the apparatus 10.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A tubular gripping apparatus comprising:

a jaw assembly having a tubular-contacting surface at an end thereof;

a drive yoke having a tubular-contacting surface at an end thereof, the drive yoke being connected to the jaw assembly;

a cylinder yoke having a nose positioned adjacent the drive yoke for movement relative thereto;

an actuator connected to the cylinder yoke;

a locking assembly interconnected between the cylinder yoke and the drive yoke, the locking assembly comprising a wedge assembly engaging the nose;

the actuator moving the cylinder yoke into the wedge assembly which moves the drive yoke and jaw assembly such that the tubular-contacting surfaces move radially inwardly for a substantially identical distance; and, the locking assembly directing a load away from the actuator while the jaw assembly and the drive yoke grip the tubular, so as to prevent backward movement of the cylinder yoke.

2. The tubular gripping apparatus of claim 1, the actuator comprising:

a piston-and-cylinder assembly connected to the drive yoke.

3. The tubular gripping apparatus of claim 1, the drive yoke having at least one bearing bar thereon, the locking assembly being adjacent the bearing bar.

4. The tubular gripping apparatus of claim 1, further comprising:

a housing connected to the actuator and the locking assembly.

5. The tubular gripping apparatus of claim 1, the locking assembly, drive yoke, actuator, and jaw assembly having a first position and a second position.

6. The tubular gripping apparatus of claim 3, the wedge assembly comprising:

a pair of clamping wedges positioned adjacent the bearing bar, the pair of clamping wedges positioned adjacent the nose of the cylinder yoke;

a braking plate having an end adjacent the pair of clamping wedges, the braking plate having an indentation formed in the end, the nose of the cylinder yoke being positioned in the indentation when in the first position;

a first braking wedge positioned adjacent a side of the braking plate;

a second braking wedge positioned adjacent an opposite side of the braking plate;

a first brake pad positioned adjacent a side of the first braking wedge opposite the braking plate;

a second brake pad positioned adjacent a side of the second braking wedge opposite the braking plate;

a first brake shoe positioned adjacent a side of the first brake pad opposite the first braking wedge;

a second brake shoe positioned adjacent a side of second brake pad opposite the second braking wedge;

a first spring connected to one of the pair of clamping wedges and to the first brake pad;

a second spring connected to another of the clamping wedge and to the second brake pad;

a third spring connected to the first braking wedge and to the housing; and a fourth spring connected to the braking plate and to the housing.

7. The tubular gripping apparatus of claim 6, the nose of the cylinder yoke having a detent, the detent extending within the indentation of the braking plate when the locking assembly is in the first position, the detent being positioned adjacent a side of the pair of clamping wedges opposite the braking plate when the locking assembly is in the second position.

8. The tubular gripping apparatus of claim 6, each of the pair of clamping wedges having a trapezoidal shape.

9. The tubular gripping apparatus of claim 6, the first spring suitable for urging the one of the pair of clamping wedges toward the other of the clamping wedges, the second spring suitable for urging the other of the clamping wedges toward the one of the clamping wedges.

10. The tubular gripping apparatus of claim 6, the third spring suitable for urging the first braking wedge toward the drive yoke, the fourth spring suitable for urging the braking plate toward the drive yoke.

11. The tubular gripping apparatus of claim 6, the pair of clamping wedges and the braking plate and the first and second braking wedges and the first and second brake pads and the first and second brake shoes being coplanar.

12. The tubular gripping apparatus of claim 1, the cylinder yoke having a portion extending through an interior of the drive yoke.

13. The tubular gripping apparatus of claim 1, the jaw assembly comprising:

a first jaw having a pipe-contacting surface at one end thereof; and a second jaw having a pipe-contacting surface at one end thereof, the drive yoke being connected to the first jaw and to the second jaw.

14. The tubular gripping apparatus of claim 13, the jaw assembly further comprising:

a first link connected to the first jaw and to the drive yoke, the first link pivotally connected at a first pivot point to the first jaw, the first link pivotally connected at a second pivot point to the drive yoke.

15. The tubular gripping apparatus of claim 14, the jaw assembly further comprising:

a second link connected to the second jaw and to the drive yoke, the second link pivotally connected at a first pivot point to the second jaw, the second link pivotally connected at a second pivot point to the drive yoke.

16. The tubular gripping apparatus of claim 15, the first link being between the first jaw and the drive yoke, the second link being between the second jaw and the drive yoke.

17. A tubular gripping apparatus having a first position and a second position comprising:

a housing;

a jaw assembly positioned adjacent the housing;

a drive yoke connected to the jaw assembly;

a piston-and-cylinder assembly connected to the drive yoke and to the housing;

a cylinder yoke positioned around the piston-and cylinder assembly, the cylinder yoke having a nose positioned adjacent the drive yoke; and a wedge assembly positioned adjacent the drive yoke, the wedge assembly positioned adjacent the cylinder yoke, the wedge assembly suitable for contacting the cylinder yoke as to prevent a movement of the cylinder yoke, the nose of the cylinder yoke being positioned within the wedge assembly when in the first position, the nose of the cylinder yoke being positioned outside the wedge assembly when in the second position.

18. The tubular gripping apparatus of claim 17, the wedge assembly comprising:

a pair of clamping wedges positioned adjacent a bearing bar of the drive yoke, the pair of clamping wedges positioned adjacent the nose of the cylinder yoke;

a braking plate having an end adjacent the pair of clamping wedges, the braking plate having an indentation formed in the end, the nose of the cylinder yoke being positioned in the indentation when in the first position;

a first braking wedge positioned adjacent a side of the braking plate;

a second braking wedge positioned adjacent an opposite side of the braking plate;

a first brake pad positioned adjacent a side of the first braking wedge opposite the braking plate;

a second brake pad positioned adjacent a side of the second braking wedge opposite the braking plate;

a first brake shoe positioned adjacent a side of the first brake pad opposite the first braking wedge; and a second brake shoe positioned adjacent a side of second brake pad opposite the second braking wedge.

19. The tubular gripping apparatus of claim 18, the cylinder yoke having a portion extending through an interior of the drive yoke.

* * * * *